United States Patent
Fan et al.

(10) Patent No.: US 12,407,583 B2
(45) Date of Patent: Sep. 2, 2025

(54) DATA ANALYTICS-BASED SERVICE LEVEL SPECIFICATION (SLS) ASSURANCE

(71) Applicant: NEC Corporation, Tokyo (JP)

(72) Inventors: Linghang Fan, Heidelberg (DE);
Hassan Al-Kanani, Heidelberg (DE);
Iskren Ianev, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/641,848

(22) PCT Filed: Oct. 5, 2020

(86) PCT No.: PCT/EP2020/077890
§ 371 (c)(1),
(2) Date: Mar. 10, 2022

(87) PCT Pub. No.: WO2021/064254
PCT Pub. Date: Apr. 8, 2021

(65) Prior Publication Data
US 2024/0049021 A1   Feb. 8, 2024

(30) Foreign Application Priority Data

Oct. 4, 2019 (EP) .................... 19201554

(51) Int. Cl.
*H04W 28/24* (2009.01)
*H04L 41/0894* (2022.01)
(Continued)

(52) U.S. Cl.
CPC ...... *H04L 41/5009* (2013.01); *H04L 41/0894* (2022.05); *H04L 41/5025* (2013.01);
(Continued)

(58) Field of Classification Search
CPC .. H04W 24/10; H04W 28/24; H04L 41/0894; H04L 41/5009; H04L 41/5025; H04L 41/5032; H04L 41/145
See application file for complete search history.

(56) References Cited

U.S. PATENT DOCUMENTS

2012/0151009 A1* 6/2012 Bouazizi ................ H04L 65/80
709/219
2016/0353268 A1* 12/2016 Senarath ............... H04L 47/805
(Continued)

FOREIGN PATENT DOCUMENTS

| WO | WO 2019010606 A1 | 1/2019 |
|----|------------------|--------|
| WO | WO 2019065617 A1 | 4/2019 |
| WO | WO 2019106055 A1 | 6/2019 |

OTHER PUBLICATIONS

3GPP, "3rd Generation Partnership Project; Technical Specification Group Services and System Aspects; Telecommunication Management; Study on Management Aspects of Communication Services (Release 16)," *3GPP Standard*, Technical Report V16.0.0., pp. 1-42, Sep. 25, 2019, XP051784815, 3GPP Mobile Competence Centre, Sophia Antipolis Cedex, France.
(Continued)

*Primary Examiner* — Edan Orgad
*Assistant Examiner* — Malick A Sohrab

(57) ABSTRACT

An operations, administration and maintenance (OAM) function provides service level specification (SLS) assurance by executing a method. The method includes: determining at least one policy for SLS assurance for a user equipment (UE) to be used in automatic quality of experience (QoE) measurement reporting, the at least one policy comprising an associated QoE measurement reporting criterion and a reporting format; and transmitting the at least one policy towards the UE.

5 Claims, 10 Drawing Sheets

(51) Int. Cl.
*H04L 41/50* (2022.01)
*H04L 41/5009* (2022.01)
*H04L 41/5025* (2022.01)
*H04W 24/10* (2009.01)

(52) U.S. Cl.
CPC ......... *H04L 41/5032* (2013.01); *H04W 24/10* (2013.01); *H04W 28/24* (2013.01)

(56) References Cited

U.S. PATENT DOCUMENTS

| | | | |
|---|---|---|---|
| 2017/0332282 A1* | 11/2017 | Dao | H04L 1/0002 |
| 2018/0270160 A1* | 9/2018 | Muñoz De La Torre Alonso | H04L 41/0893 |
| 2019/0222491 A1* | 7/2019 | Tomkins | H04L 41/0823 |
| 2019/0319840 A1* | 10/2019 | Cheng | H04L 41/147 |
| 2020/0153712 A1* | 5/2020 | Miao | H04W 72/12 |
| 2020/0162949 A1* | 5/2020 | He | H04W 24/08 |
| 2021/0218679 A1* | 7/2021 | Chong | H04L 43/20 |
| 2021/0250814 A1* | 8/2021 | Poe | H04W 28/0236 |
| 2024/0007901 A1* | 1/2024 | Zhu | H04W 28/065 |

OTHER PUBLICATIONS

3GPP, "3$^{rd}$ Generation Partnership Project; Technical Specification Group Services and System Aspects; Study of Enablers for Network Automation for 5G (Release 16)," *3GPP Draft*; 23791-120, pp. 1-119, Dec. 5, 2018, XP051846052, 3GPP Mobile Competence Centre, Sophia Antipolis Cedex, France.

\* cited by examiner 11-20

DATA ANALYTICS-BASED SERVICE LEVEL SPECIFICATION (SLS) ASSURANCE

CROSS REFERENCE TO RELATED APPLICATIONS

This application is a U.S. National Phase application under 35 U.S.C. § 371 of International Application No. PCT/EP2020/077890, filed on Oct. 5, 2020, and claims benefit to European Patent Application No. EP 19201554.3, filed on Oct. 4, 2019. The International Application was published in English on Apr. 8, 2021, as WO 2021/064254 A1 under PCT Article 21(2).

FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to service assurance based on data analytics and quality of experience (QoE) measurements in the so-called '5G' (or 'Next Generation' (NG)) systems.

BACKGROUND

The 3GPP Working Groups are currently defining the 5G system.
  The 3GPP TSG SA WG5 (SA5) is specifying the requirements, architecture and solutions for provisioning and management of the network (radio access network (RAN), core network (CN), internet protocol multimedia subsystem (IMS)) and its services. Within SA5, Quality of Experience (QoE) measurements collection has been defined and documented in a technical specification TS 28.404 V16.0.0 [4] and TS 28.405 V1.0.0 [5].
  The 3GPP TSG SA WG2 is specifying the system architecture and procedures for 5G systems. In order to provide network data analytics in 5G networks, a Network Function (NF) called Network Data Analytics Function (NWDAF) is being specified in the 3GPP TSG SA WG2. QoE measurements are also important for the core network. TS23.288 v16.1.0 [8] states that "QoE measurements from the applications are based on outcome of the ongoing SA5 Rel-16 WID "Management of QoE measurement collection" which addresses how to collect the QoE measurements from the applications in the UE".
  Recently, a new work item "Closed loop SLS Assurance" has been proposed in SA5 to specify a closed loop assurance solution that helps an operator to continuously deliver the expected level of communication service quality.

SUMMARY

In an embodiment, the present disclosure provides an operations, administration and maintenance (OAM) function provides service level specification (SLS) assurance by executing a method. The method includes: determining at least one policy for SLS assurance for a user equipment (UE) to be used in automatic quality of experience (QoE) measurement reporting, the at least one policy comprising an associated QoE measurement reporting criterion and a reporting format; and transmitting the at least one policy towards the UE.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
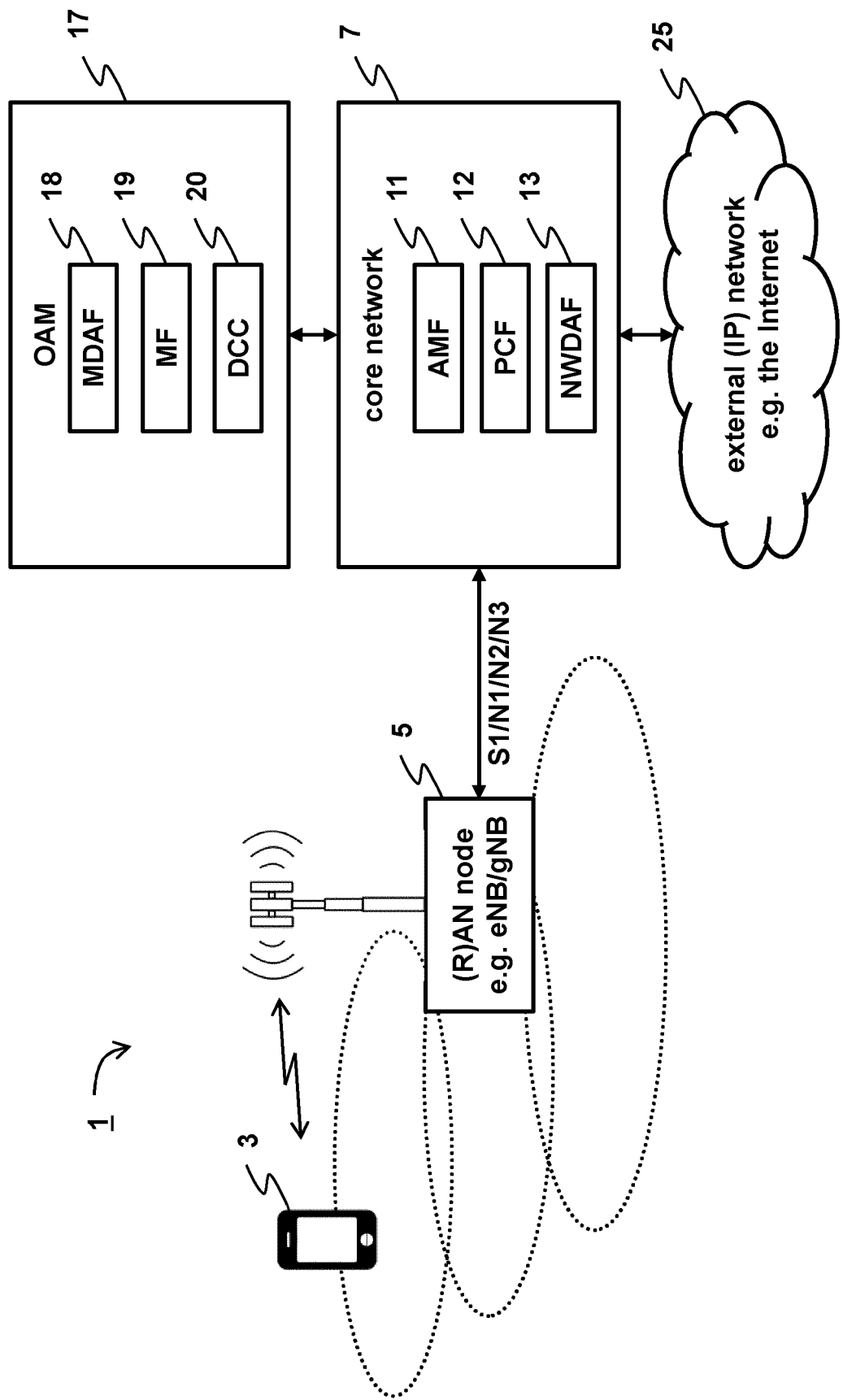
FIG. 1 illustrates schematically a mobile (cellular or wireless) telecommunication system to which embodiments of the invention may be applied.

Because Service Level Specification (SLS) assurance is always a challenging task for operators, as pointed out in the SA5 work item, there is a need to create a closed loop management service that automatically adjusts and optimizes the NG-RAN and 5GC configurations based on the various performance management and QoE measurements input, and the state of the 5G network, using data analytics techniques such as machine learning (ML) and artificial intelligence (AI).
  The QoE measurements collection is an important mechanism for 5G-core (5GC) and the operations, administration, and management (OAM) to improve end user's experience. However, there are several problems in the existing QoE measurement collection procedure, which is an integral part of SLS assurance solution.
  Firstly, the existing QoE measurements collection procedure cannot perform automatically. This procedure is triggered when there is a customer complaint. In this procedure, an operator's request is transferred to the user equipment (UE) via the OAM and 5GC, and then the UE collects the requested information and sends it to the specified collection centre. This is an inefficient and lengthy process, and cannot adjust the system configurations in timely manner to guarantee SLS.
  Secondly, according to current specifications, the UE reports QoE measurements only on two service types to the network based on the network's requests: streaming services and Multimedia Telephony Service for IMS (MTSI). It does not cover other service types, such as gaming, whose QoE needs to be measured and reported to the network to ensure end users' quality of experience.
  According to current specifications, UE's QoE measurements are sent to a specified collection centre, which doesn't have any data analytics capability. This leads to the OAM makes its decision purely based on the QoE measurements directly collected from the UE, which may not be very reliable.

Clearly there is a need to define a new solution which can automate the service assurance and maintain SLS.

Accordingly, preferred embodiments of the present invention provide methods and apparatus which address or at least partially deal with one or more of the above issues.

Although for efficiency of understanding for those of skill in the art, embodiments of the invention will be described in detail in the context of a 3GPP system (NR), the principles of the invention can be applied to other systems in which communication devices or User Equipment (UE) access a core network using a radio access technology.

In one aspect, the present disclosure provides a method performed by an operations, administration and maintenance (OAM) function for service level specification (SLS) assurance, the method comprising: determining at least one policy for SLS assurance for a user equipment (UE) to be used in automatic quality of experience (QoE) measurement reporting, the at least one policy including an associated QoE measurement reporting criterion and a reporting format; and transmitting said at least one policy towards said UE.

In one aspect, the present disclosure provides a method performed by a user equipment (UE) for service level specification (SLS) assurance, the method comprising: receiving, from an operations, administration and maintenance (OAM) function, at least one policy for SLS assurance to be used in automatic quality of experience (QoE) measurement reporting, the at least one policy including an associated QoE measurement reporting criterion and a reporting format; and performing QoE measurement reporting based on said at least one policy.

In one aspect, the present disclosure provides a method performed by a user equipment (UE) for service level specification (SLS) assurance, the method comprising: reporting results of a QoE measurement to a data collection centre, based on an associated criterion, when at least one of the following is met: the UE determines a QoE degradation associated with a service type; and the UE determines that at least one QoE metric of a service type is below an associated threshold.

In one aspect, the present disclosure provides an operations, administration and maintenance (OAM) function for service level specification (SLS) assurance, the OAM function comprising: means for determining at least one policy for SLS assurance for a user equipment (UE) to be used in automatic quality of experience (QoE) measurement reporting, the at least one policy including an associated QoE measurement reporting criterion and a reporting format; and means for transmitting said at least one policy towards said UE.

In one aspect, the present disclosure provides a user equipment (UE) for service level specification (SLS) assurance, the UE comprising: means for receiving, from an operations, administration and maintenance (OAM) function, at least one policy for SLS assurance to be used in automatic quality of experience (QoE) measurement reporting, the at least one policy including an associated QoE measurement reporting criterion and a reporting format; and means for performing QoE measurement reporting based on said at least one policy.

In one aspect, the present disclosure provides a user equipment (UE) for service level specification (SLS) assurance, the UE comprising: means for reporting results of a QoE measurement to a data collection centre, based on an associated criterion, when at least one of the following is met: the UE determines a QoE degradation associated with a service type; and the UE determines that at least one QoE metric of a service type is below an associated threshold.

In another aspect, the present disclosure provides an operations, administration and maintenance (OAM) function for service level specification (SLS) assurance, the OAM function comprising a transceiver and a controller, wherein the controller is configured to: determine at least one policy for SLS assurance for a user equipment (UE) to be used in automatic quality of experience (QoE) measurement reporting, the at least one policy including an associated QoE measurement reporting criterion and a reporting format; and control the transceiver to transmit said at least one policy towards said UE.

In another aspect, the present disclosure provides a user equipment (UE) for service level specification (SLS) assurance, the UE comprising a transceiver and a controller, wherein the controller is configured to: control the transceiver to receive, from an operations, administration and maintenance (OAM) function, at least one policy for SLS assurance to be used in automatic quality of experience (QoE) measurement reporting, the at least one policy including an associated QoE measurement reporting criterion and a reporting format; and perform QoE measurement reporting based on said at least one policy.

In another aspect, the present disclosure provides a user equipment (UE) for service level specification (SLS) assurance, the UE comprising a transceiver and a controller, wherein the controller is configured to: report results of a QoE measurement to a data collection centre, based on an associated criterion, when at least one of the following is met: the UE determines a QoE degradation associated with a service type; and the UE determines that at least one QoE metric of a service type is below an associated threshold.

Aspects of the present disclosure extend to corresponding systems, apparatus, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the present invention independently of (or in combination with) any other disclosed and/or illustrated features. In particular but without limitation the features of any of the claims dependent from a particular independent claim may be introduced into that independent claim in any combination or individually.

Exemplary embodiments of the present invention will now be described, by way of example, with reference to the accompanying drawings in which:

FIG. 1 schematically illustrates a mobile (e.g., cellular or wireless) telecommunication system 1 to which the above embodiments are applicable.

In this network, users of mobile devices 3 (UEs) can communicate with each other and other users via respective base stations 5 and a core network 7 using an appropriate 3GPP radio access technology (RAT), for example, an evolved universal mobile telecommunications system terrestrial radio access (E-UTRA) and/or 5G RAT. It will be appreciated that a number of base stations 5 form a (radio) access network or (R)AN. As those skilled in the art will appreciate, while one mobile device 3 and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighboring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 can include logical nodes (or 'functions') for supporting communication in the telecommunication system 1. For example, the core network 7 of a 'Next Generation'/5G system may include, amongst other functions, control plane functions (CPFs) and user plane functions (UPFs). It will be appreciated that the core network 7 may also include, amongst others: an Access and Mobility Management Function (AMF) 11; a Policy Control Function (PCF) 12, and a Network Data Analytics Function (NWDAF) 13.

Operations, Administration and Maintenance (OAM) 17 functionality may also be provided via one or more nodes/functions coupled to the core network 7 (as shown in FIG. 1). Such OAM functionality includes for example a Management Data Analytics Function (MDAF) 18, a Management Function (MF) 19, and a Data Collection Centre (DCC) 20.

From the core network 7, connection to an external IP network/data network 25 (such as the Internet) is also provided.

The components of this system 1 are configured to perform data analytics based on QoE measurements reporting. The OAM (e.g. the MDAF 18) decides policies with QoE measurement reporting criteria and reporting format for the UE 3. The UE 3 reports (automatically) its QoE measurement according to the policies, and a data analytics function (e.g. the MDAF 18 or the NWDAF 13) performs data analytics based on the QoE measurements report.

User Equipment (UE)

Figure 2:
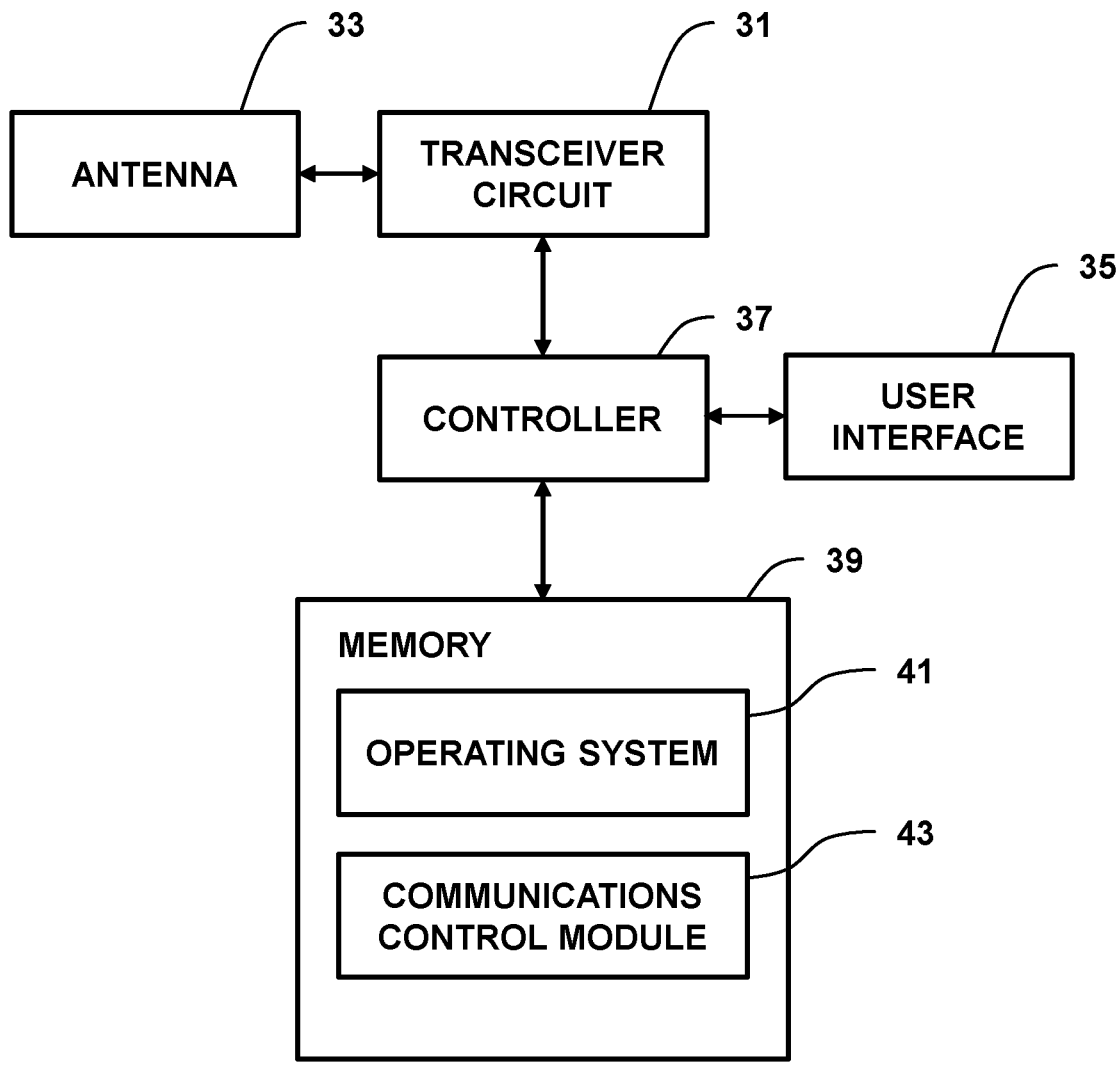
FIG. 2 is a block diagram of a User Equipment (UE) forming part of the system shown in FIG. 1.

FIG. 2 is a block diagram illustrating components of the UE (mobile device 3) shown in FIG. 1. As shown, the UE includes a transceiver circuit 31, which is operable to transmit signals to and to receive signals from the connected node(s) via one or more antenna 33. The UE can have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signaling messages and uplink/downlink data packets between the UE 3 and other nodes, including (R)AN nodes 5, core network nodes, and OAM functions. Such signaling includes appropriately formatted requests and responses relating to data analytics based on QoE measurement report.

(R)AN Node

Figure 3:
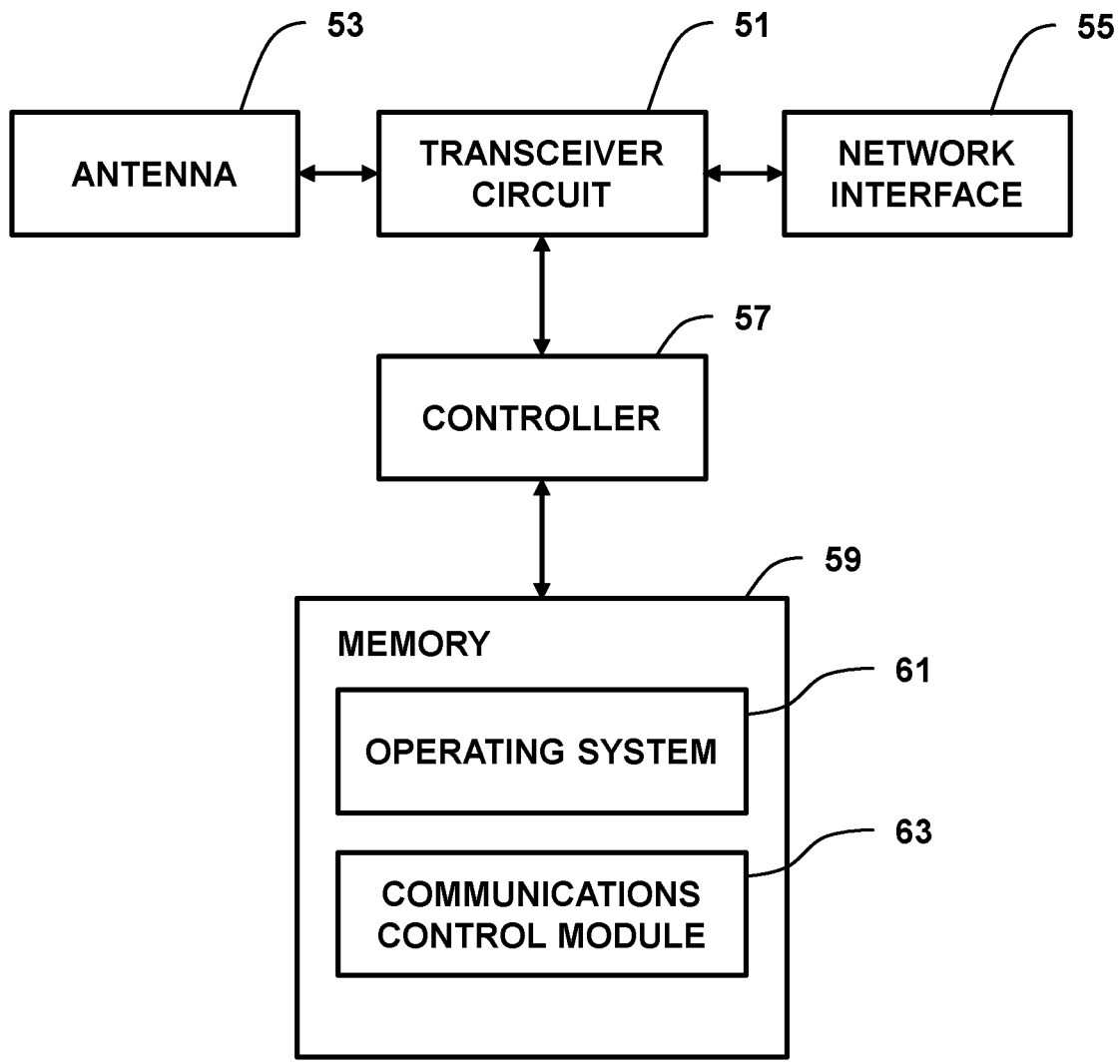
FIG. 3 is a block diagram of a base station forming part of the system shown in FIG. 1.

FIG. 3 is a block diagram illustrating components of an exemplary (R)AN node 5 (base station) shown in FIG. 1. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically may include an appropriate base station—base station interface (such as X2/Xn) and an appropriate base station—core network interface (such as S1/N1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signaling between the (R)AN node 5 and other nodes, such as the UE 3 and the core network/OAM nodes. Such signaling includes appropriately formatted requests and responses relating to data analytics based on QoE measurement report.

Core Network/OAM Node

Figure 4:
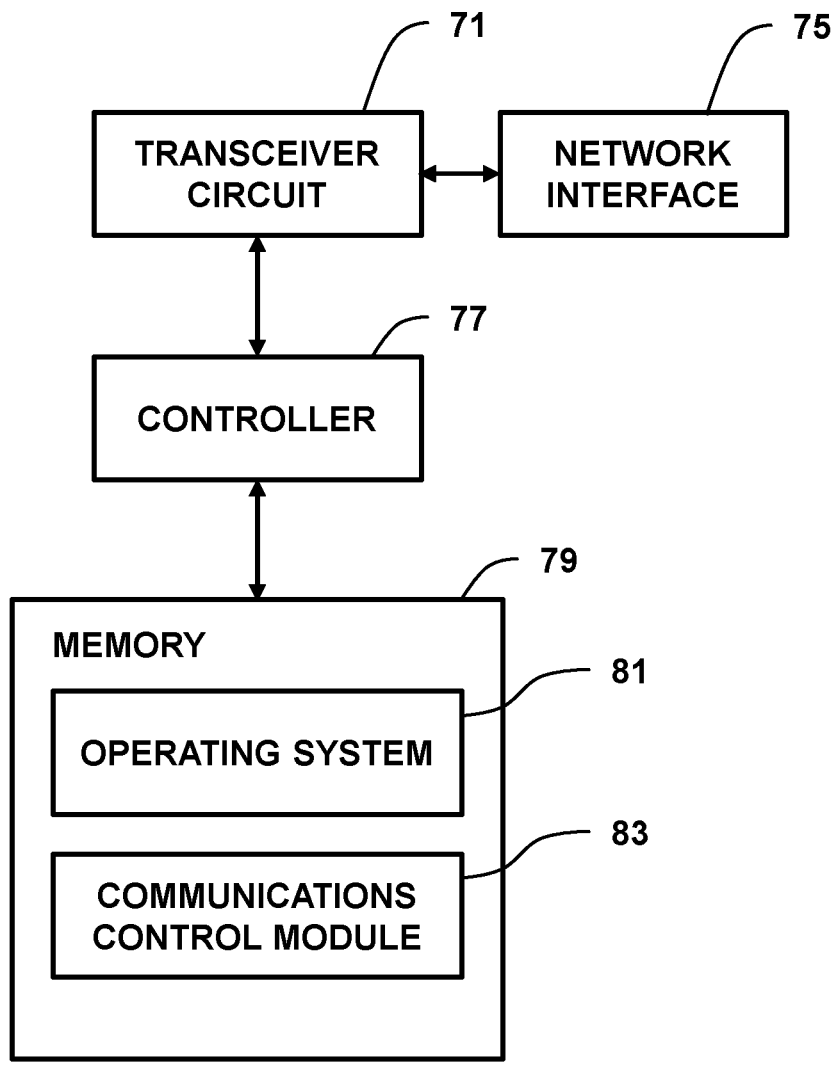
FIG. 4 is a block diagram of a core network node entity forming part of the system shown in FIG. 1.

FIG. 4 is a block diagram illustrating components of a generic core network node (or function) shown in FIG. 1, for example, the AMF 11, the PCF 12, and the NWDAF 14. It will be appreciated that the same block diagram may be applicable to the OAM 17 as well, for example, the MDAF 18, the MF 19, and the Data Collection Centre 20. As shown, the core network/OAM node includes a transceiver circuit 71 which is operable to transmit signals to and to receive signals from other nodes (including the UE 3 and the (R)AN node 5) via a network interface 75. A controller 77 controls the operation of the core network/OAM node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network/OAM node and other nodes, such as the UE 3, (R)AN node 5, and other core network/OAM nodes. Such signaling includes appropriately formatted requests and responses relating to data analytics based on QoE measurement report.

In order to address the aforementioned problems, the inventors provide a data analytics-based SLS assurance mechanism. According to an embodiment, the data analytics-bases SLS assurance mechanism is a close-loop SLS assurance mechanism, which involves the UE 3, the RAN 5, the core network 7 and the OAM 17. This mechanism has a new trigger to enable automatic reporting of the QoE degradation on certain service type, by conducting data analytics on the collected QoE measurement, and adjusting the network configuration based on UE's QoE measurements report and analytics result in an end-to-end close-loop design.

The following is a detailed description of two exemplary embodiments of the present disclosure:
- Embodiment 1: Management Data Analytics Function (MDAF) performs data analytics based on QoE measurements report in the close loop SLS assurance solution
- Embodiment 2: Network Data Analytics Function (NWDAF) performs data analytics based on QoE measurements report in the close loop SLS assurance solution Embodiment 1—MDAF performs data analytics based on QoE measurements report in the close loop SLS assurance solution In this Embodiment, the Management Data Analytics service producer within the OAM system 17, e.g., the Management Data Analytics Function (MDAF) 18, or any other relevant entity, function or service dedicated for the purpose in the OAM 17 performs the data analytics and produces relevant analytics service (analytics results) based on the QoE measurements report collected and reported by the UE 3. The analytic service or report can be consumed (i.e., reported to or subscribed to) by the relevant consumer, function or service within the OAM system 17 and/or network, e.g., by a Management Function (MF) 19 within the OAM 17 and/or within the network e.g. by the NWDAF 13.

Figure 5A:
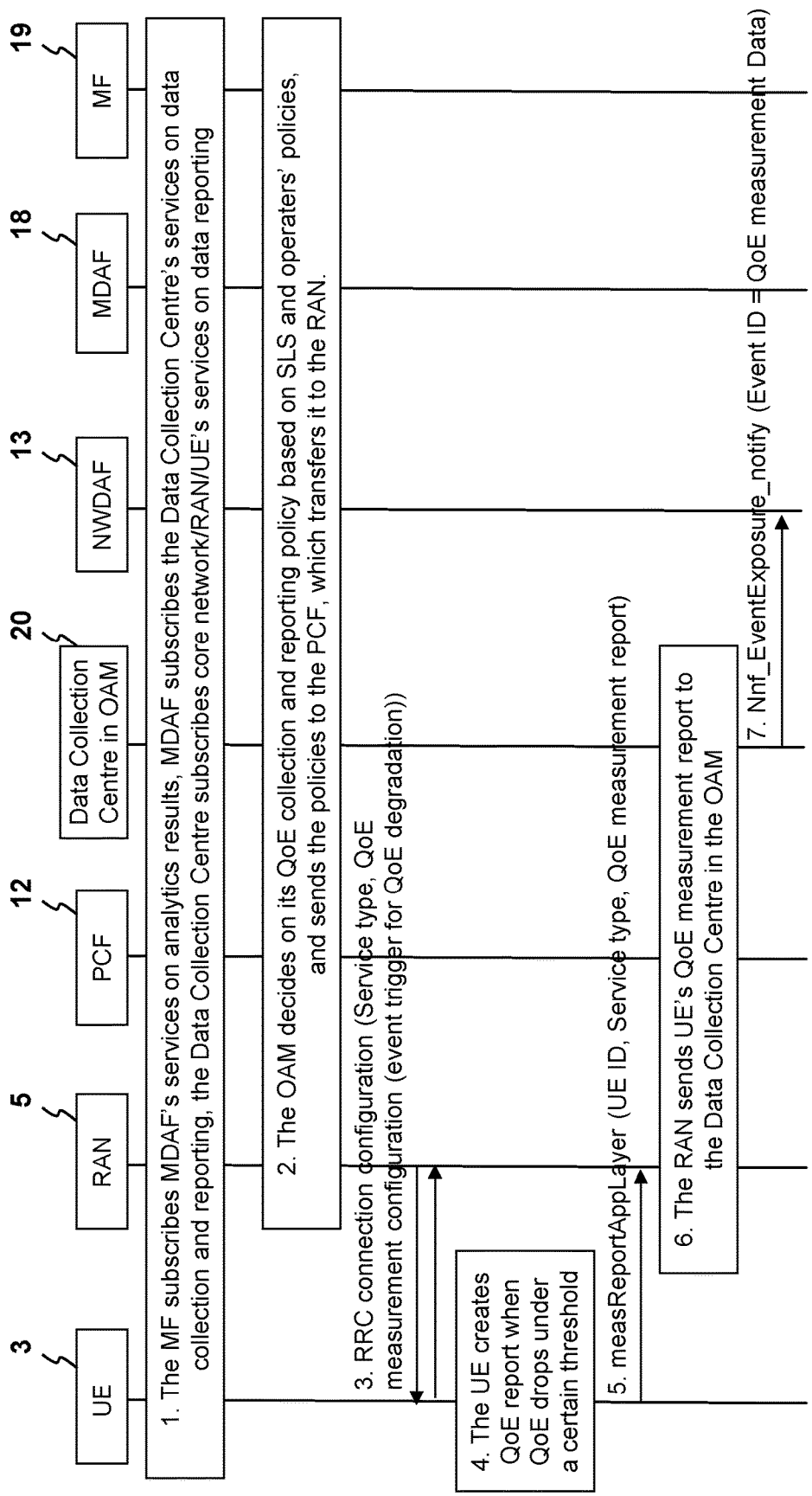
FIGS. 5a to 5c and 6a to 6c are schematic signalling (timing) diagrams illustrating exemplary ways in which service assurance based on data analytics and QoE measurements may be performed in the system shown in FIG. 1.
Figure 5B:
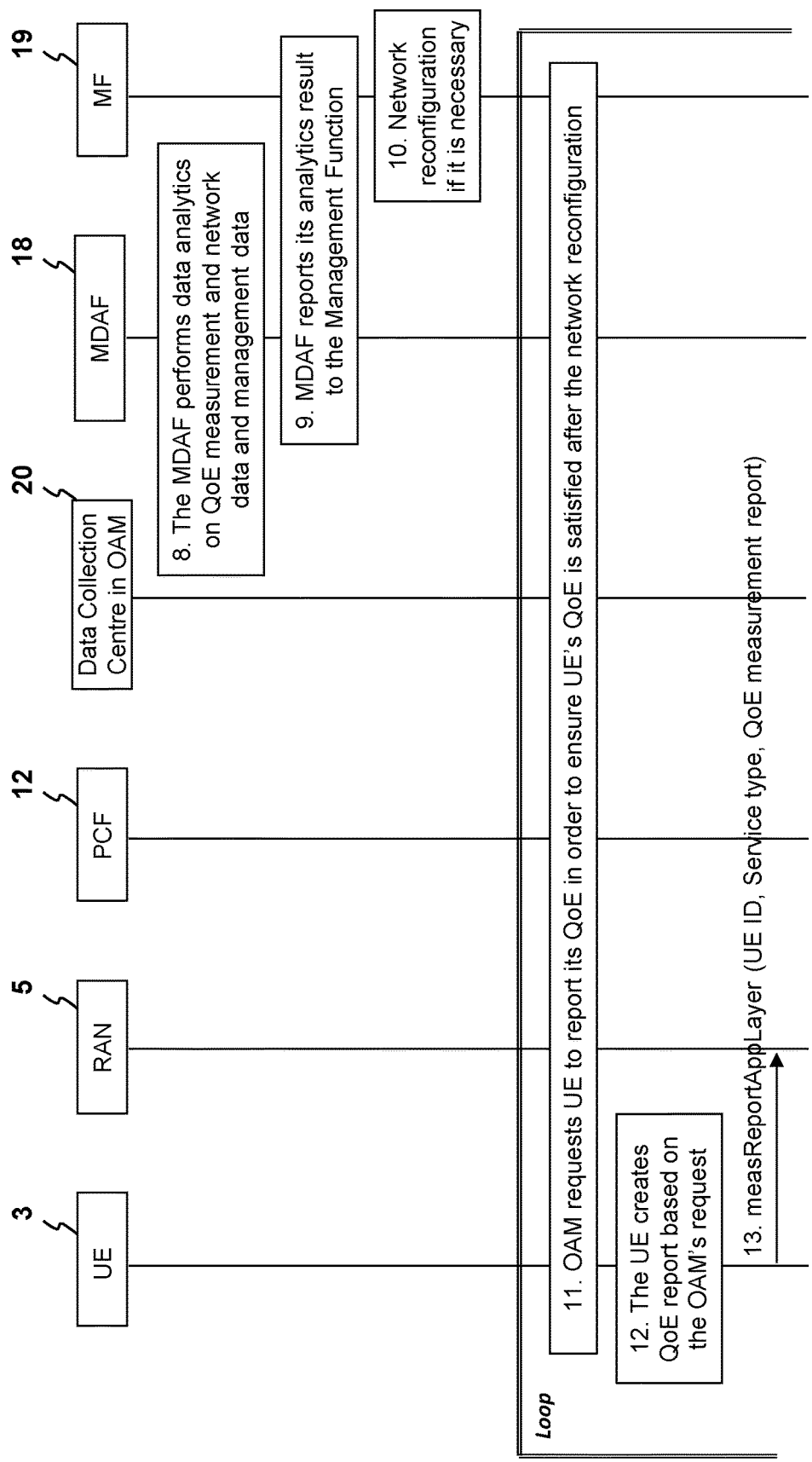
Figure 5C:
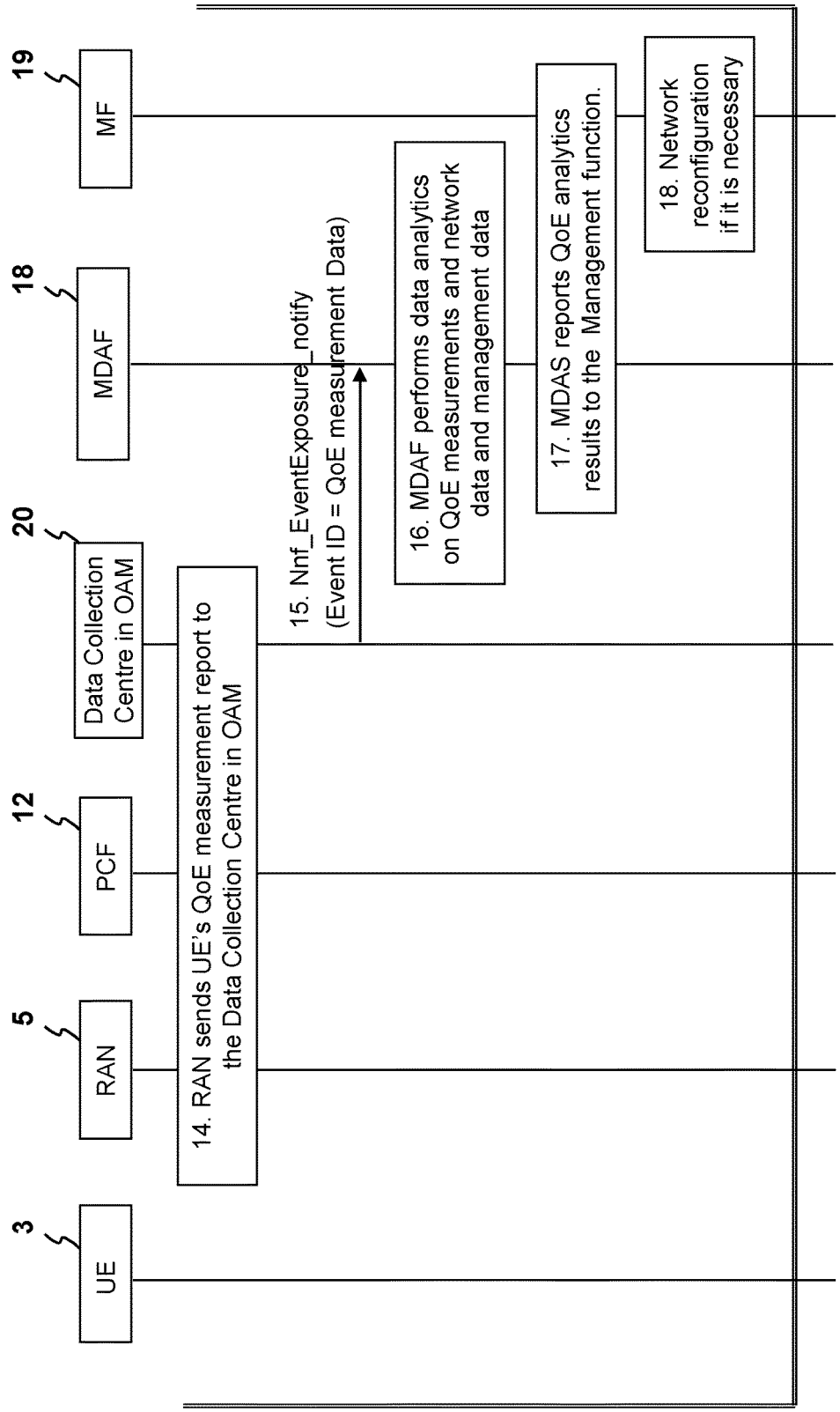

FIGS. 5a to 5c demonstrate schematically an exemplary procedure for the OAM analytics service producer, e.g., an MDAF 18 (or any other relevant service, function or entity dedicated for the purpose) that performs data analytics based on the QoE measurement report (collected and reported by the UE 3) as part of the close loop SLS assurance solution.

Step 1: The MDAF 18 or any other relevant entity, function or service in the OAM 17 invokes the event exposure service procedure or any other procedure adopted for the purpose or sends the Data Collection Centre 20, e.g., a Trace Collection Entity (TCE) or any other relevant entity or service dedicated for the purpose in the OAM 17 to subscribe to the collection of QoE measurements data from the Data Collection Centre 20 in the OAM 17. Besides the data obtained from the Data Collection Centre 20 in the OAM 17, the MDAF 18 may also subscribe for other network data from network entities, functions or services and management data from management functions entities or services (i.e., Management Service "MnS") on the purpose of performing its data analytics. The MF subscribes into the MDAF's services to obtain analytics results from the MDAF 18. The Data Collection Centre 20 in the OAM 17 subscribes into core network/RAN/UE's services on data reporting to obtain the required data from core network/RAN/UE. The data collection center (e.g., TCE) may obtain data via file-based or non-file based mechanisms (e.g., via streaming).

Step 2: The MF or any other relevant entity or service in the OAM 17 decides the QoE measurement collection and reporting policy based on the SLS and operators' policies, and sends these policies to the PCF 12, which then transfers the policies to the RAN 5.

Step 3: The RAN 5 invokes the QoE measurement configuration procedure or any other procedure or sends the UE 3 an RRC connection reconfiguration message or any other message with the information on the measurement configuration to configure the UE 3 on QoE measurement(s) and collection reporting-criterion and reporting-format. The QoE measurements configuration criterion and reporting format include parameters, at least one of the type of reporting, the service type, the event that triggers the QoE measurement reporting, and thresholds that triggers the start of QoE measurement reporting. The types of reporting can be either scheduled or event-based reporting. The service type includes the type of service for QoE measurement reporting, at least one of streaming services, MTSI services, Network Controlled Interactive Service, VR Based Interactive Service, Cloud Rendering for Games, and IoE based social networking services. The event that triggers the QoE measurement reporting includes the event(s), at least one of QoE metrics of a certain service type is below a threshold. Thresholds that trigger the QoE measurement reporting include the threshold(s) of QoE metrics of a certain service type, at least one of Representation Switch Events, Average Throughput, Initial Playout Delay, Buffer Level, Play List, MPD Information, Playout Delay for Media Start-up and Device information.

Step 4: If the QoE measurement on a certain service type drops below certain, pre-defined threshold, the UE 3 records the QoE measurement on the specific service type, the QoE metrics, location and time in a QoE measurement collection report.

When the QoE measurements are triggered the UE 3 may also trigger the start and report of other lower layer measurements including coverage quality, signal strength, packet loss, and other related measurements.

Step 5: The UE 3 invokes the measurement reporting procedure or any other procedure or sends the RAN 5 a measReportAppLayer message or any other relevant message with the QoE measurement report to report to the RAN 5 the QoE measurement(s). The QoE measurements report may include parameters, at least one of a UE ID, a service type, and the measurement on the QoE metrics, location and time.

Other measurements, such as signal strength and packet loss, can also be included in the QoE measurement reports.

Step 6: The RAN 5 sends UE's QoE measurement report to the Data Collection Centre 20 (e.g., TCE) or any other relevant entity or service consumer/producer in the OAM 17.

Step 7: The Data collection Centre 20 (e.g., TCE) or any other relevant entity or service consumer/producer in the OAM 17 notifies the MDAF 18 or any other relevant entity or service consumer the UE QoE measurement report.

Step 8: The MDAF 18 or any other relevant entity or service consumer/producer performs data analytics on QoE measurements, related network data from the core network 7 and management data from the OAM 17.

Step 9: The MDAF 18 or any other relevant entity or service consumer/producer reports QoE analytics results to the management function or any other relevant function or service. The QoE analytics results are based on data analytics on QoE measurements, related network data and management data.

Step 10: The Management Function (MF) or any other relevant entity or service consumer/producer in the OAM 17 makes its decision and applies the new configurations to the network and the RAN 5 if it is necessary.

Step 11: In order to ensure UE's QoE is satisfied after the network reconfiguration, the Management Function (MF) or any other relevant entity or service consumer/producer in the OAM 17 invokes the QoE measurement reporting procedure or any other procedure to request the UE 3 to report its QoE measurement. This step is not needed if the UE 3 is scheduled to report to the network its measurements.

Step 12: The UE 3 records the QoE measurement on the QoE metrics, the service type, location and time in a QoE measurement report. Step 13: The UE 3 sends the RAN 5 a measReportAppLayer message or any other message with the QoE measurement(s) report to inform the RAN 5 the QoE measurement. The QoE measurement report may include parameters, at least one of a UE ID, a service type, and the measurement on the QoE metrics, location and time.

Step 14: The RAN 5 sends UE's QoE measurement report to the Data Collection Centre 20 in the OAM 17.

Step 15: The Data Collection Centre 20 in the OAM 17 notifies the MDAF 18 or any other relevant entity or service consumer/producer in the OAM 17 the UE's QoE measurement report.

Step 16: The MDAF 18 or any other relevant entity or service consumer/producer in the OAM 17 performs data analytics on QoE measurements and related network and management data.

Step 17: The MDAF 18 or any other relevant entity or service consumer/producer in the OAM 17 reports QoE analytics results to the Management Function (MF) or any other relevant entity or service consumer/producer. The QoE analytics results are based on data analytics on QoE measurements, related network data and management data.

Step 18: The Management Function (MF) or any other relevant entity or service consumer/producer in the OAM 17 make its decision and applies the new configuration to the network and the RAN 5 if it is necessary.

Repeat Step 11 to 18 until UE's QoE is satisfied (i.e. SLS is guaranteed).

Embodiment 2—NWDAF performs data analytics based on QoE measurement report in the close loop SLS assurance solution In this Embodiment, an NWDAF 13 in the core network 7 performs data analytics based on the QoE measurement report collected from the UE 3, and notifies the Management Function (MF) 19 or any other relevant entity or service its analytics results.

Figure 6A:
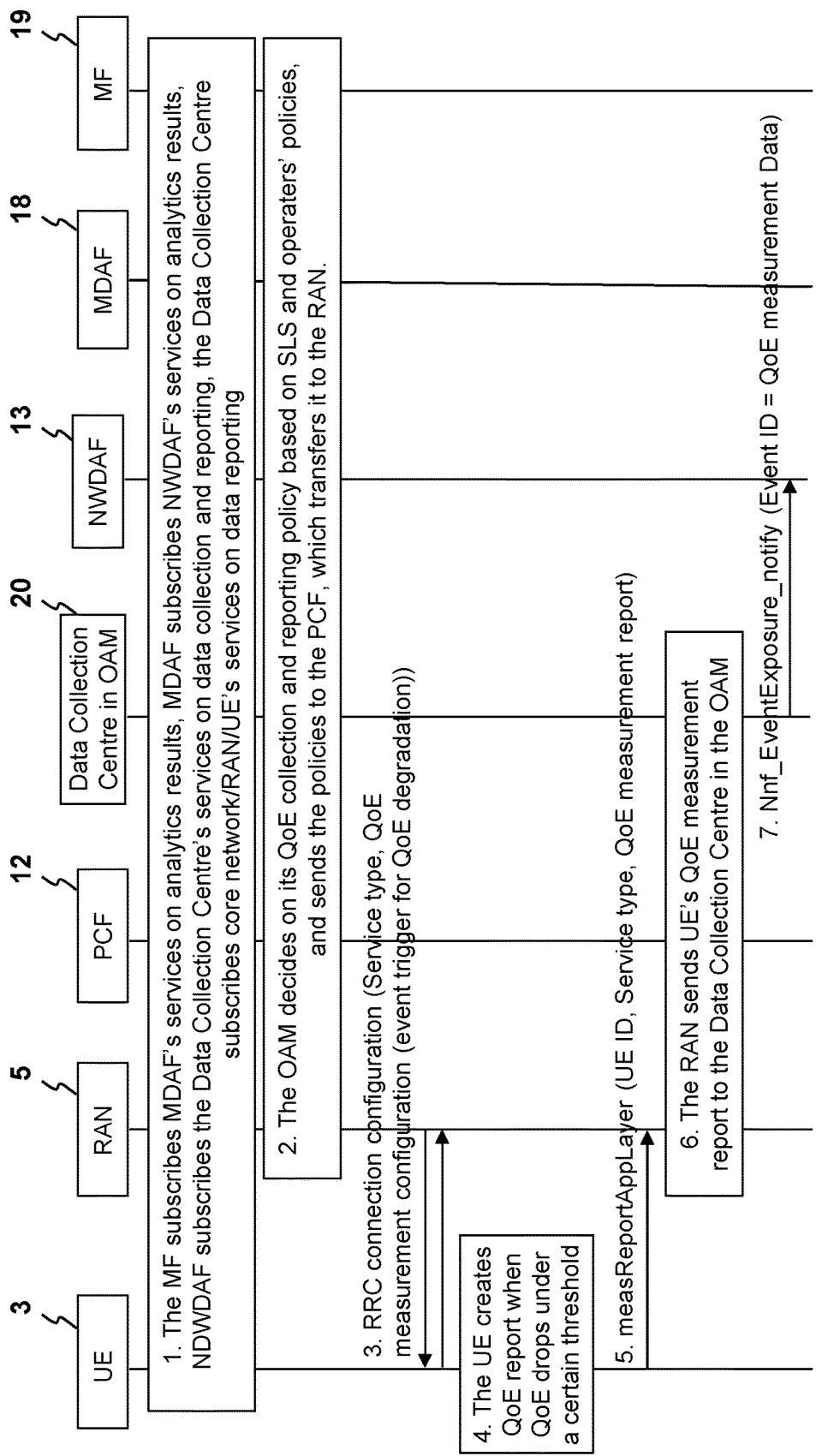
Figure 6B:
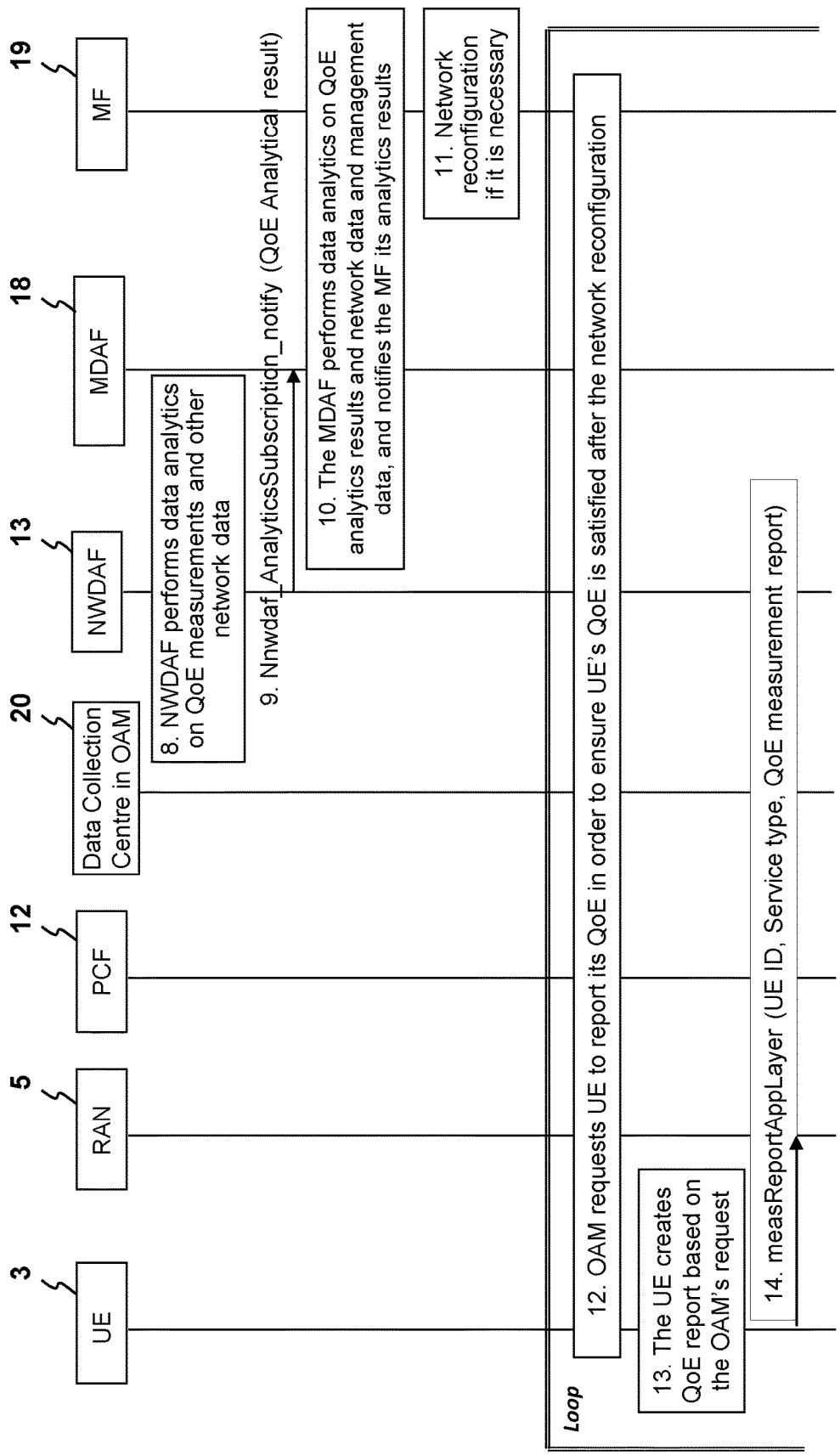
Figure 6C:
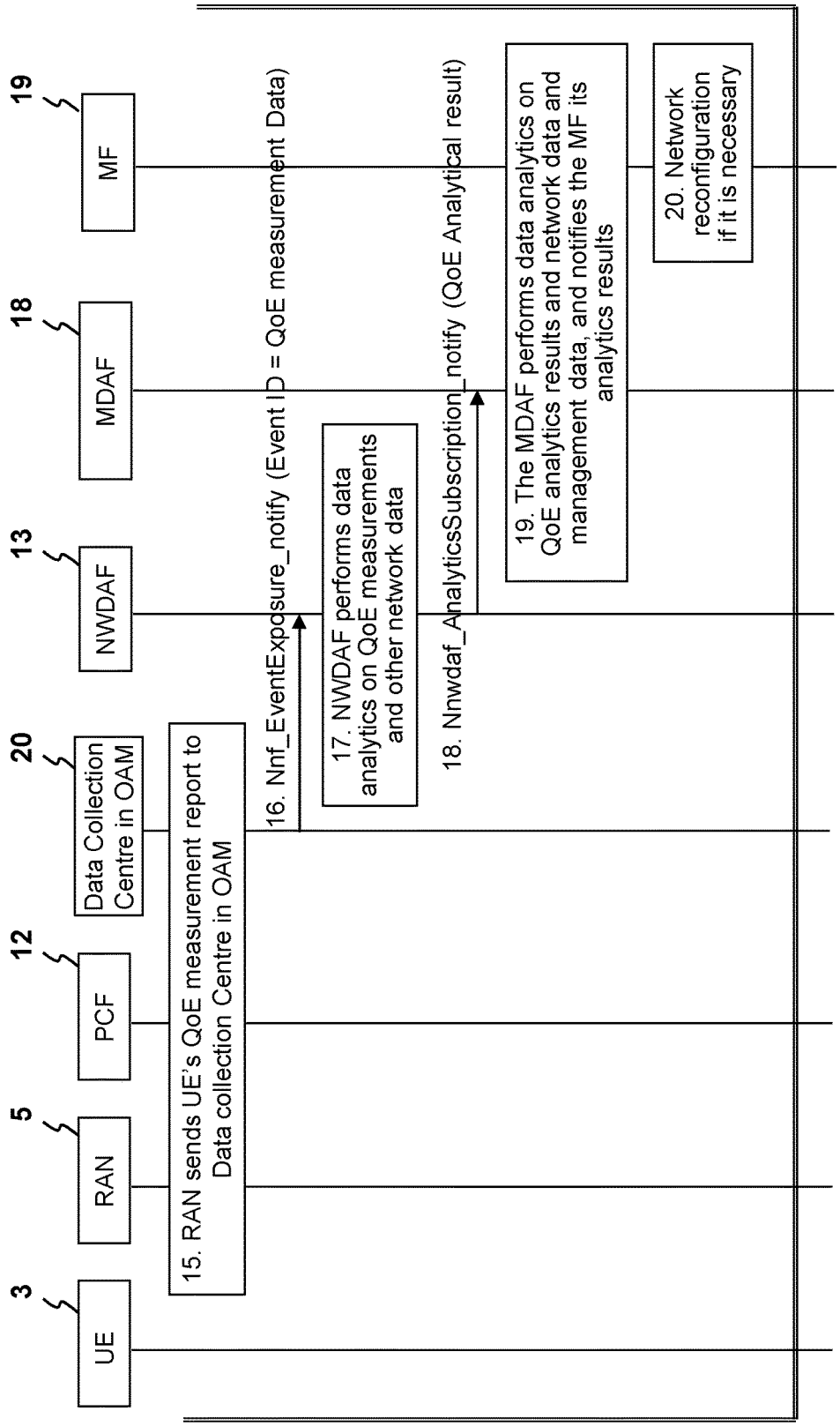

FIGS. 6a to 6c demonstrate schematically an exemplary procedure for an NWDAF 13 that performs data analytics based on QoE measurement report in the close loop SLS assurance solution.

Step 1: The MDAF 18 or any other entity or service consumer/producer in the OAM 17 subscribes to NWDAF's service by sending Nnwdaf_Events_Subscription_Subscribe message or any other service procedure or message for the purpose of subscribing to analytics and/or statistics information from the NWDAF 13. Besides the analytics information from the NWDAF 13, the MDAF 18 subscribes other network data from network entities and management data from other management functions or service producers/consumers on the purpose of performing its data analytics. The MF subscribes to the MDAF's services to obtain analytics results from the MDAF 18. The NWDAF 13 invokes the event exposure service procedure or any other procedure or sends the Data Collection Centre 20 or any other relevant entity or service consumer/producer in the network or the OAM 17 an Nnf_EventExposure_Subscribe message to subscribe the collection of QoE measurement data from the Data Collection Centre 20 in or any other relevant entity or service consumer/producer in the network or the OAM 17. Besides the data from the Data Collection Centre 20 in the OAM 17, the NWDAF 13 subscribes other network data from network entities and management data from management functions on the purpose of performing its data analytics. The Data Collection Centre 20 in the OAM 17 subscribes core network/RAN/UE's services on data reporting to obtain the required data from core network/RAN/UE.

Step 2: The MF or any other relevant entity or service consumer/producer in the OAM 17 decides the QoE measurement collection and reporting policy based on the SLS and operators' policies, and sends these policies to the PCF 12, who transfers the policies to the RAN 5.

Step 3: The RAN 5 invokes the QoE measurement configuration procedure or any other procedure or sends the UE 3 an RRC connection reconfiguration message or any other message with the information on the measurement configuration to configure the UE 3 on QoE measurement and collection reporting criterion and reporting format. The QoE measurement configuration criterion and reporting format include parameters, at least one of the type of reporting, the service type, the event that triggers the QoE measurement reporting, and thresholds that triggers the QoE measurement reporting. The types of reporting can be either scheduled or event-based reporting. The service type includes the type of service for QoE measurement reporting, at least one of streaming services, MTSI services, Network Controlled Interactive Service, VR Based Interactive Service, Cloud Rendering for Games, and IoE based social networking services. The event that triggers the QoE measurement reporting includes the event(s), at least one of QoE metrics of a certain service type is below a threshold. Thresholds that trigger the QoE measurement reporting include the threshold(s) of QoE metrics of a certain service type, at least one of Representation Switch Events, Average Throughput, Initial Playout Delay, Buffer Level, Play List, MPD Information, Playout Delay for Media Start-up and Device information.

Step 4: If the QoE measurement on a certain service type drops below certain threshold, the UE 3 records the QoE measurement(s) on the service type, the QoE metrics, location and time in a QoE measurement collection report. Other measurements, such as signal strength and packet loss, can also be included in the QoE measurement reports.

Step 5: The UE 3 invokes the measurement reporting procedure or any other procedure or sends the RAN 5 a measReportAppLayer message or any other message with the QoE measurement report to report the RAN 5 the QoE measurement. The QoE measurement report may include parameters, at least one of a UE ID, a service type, and the measurement on the QoE metrics, location and time.

Other measurements, such as signal strength and packet loss, can also be included in the QoE measurement reports.

Step 6: The RAN 5 sends UE's QoE measurement report to the Data Collection Centre 20 or any other relevant entity or service consumer/producer in the network or the in the OAM 17.

Step 7: The Data Collection Centre 20 or any other relevant entity or service consumer/producer in the network or the in the OAM 17 notifies the NWDAF 13 the UE QoE measurement report.

Step 8: The NWDAF 13 performs data analytics on QoE measurements, and related network data. Management data also can be used in the data analytics if it is needed.

Step 9: The NWDAF 13 notifies the MDAF 18 its QoE analytics results. The QoE analytics results are based on data analytics on QoE measurements and related network data/management data.

Step 10: The MDAF 18 or any other relevant entity or service consumer/producer in the OAM 17 performs further data analytics on QoE analytics results provided by the NWDAF 13 and other network and management data, and notifies the Management Function or any other entity or service consumer/producer in the OAM 17 its analytics results.

Step 11: The Management Function or any other relevant entity or service consumer/producer in the OAM 17 make its decision and applies the new configurations to the network and to the RAN 5 if it is necessary.

Step 12: In order to ensure UE's QoE is satisfied after the network reconfiguration, the Management Function or any other relevant entity or service consumer/producer in the OAM 17 invokes the QoE measurement reporting procedure or any other procedure to request the UE 3 to report its QoE measurement. This step is not needed if the UE 3 is scheduled to report to the network its measurements.

Step 13: The UE 3 records the QoE measurement on the QoE metrics, the service type, location and time in a QoE measurement report.

Step 14: The UE 3 sends the RAN 5 a measReportAppLayer message or any other message with the QoE measurement report to inform the RAN 5 the QoE measurement. The QoE measurement report may include parameters, at least one of a UE ID, a service type, and the measurement on the QoE metrics, location and time.

Step 15: The RAN 5 sends UE's QoE measurement report to the Data Collection Centre or any other relevant entity or service consumer/producer in the network or in the OAM 17.

Step 16: The Data Collection Centre 20 or any other relevant entity or service consumer/producer in the network or in the OAM 17 notifies the NWDAF 13 the UE QoE measurement report.

Step 17: The NWDAF 13 performs data analytics on QoE measurements and related network data. Management data also can be used in the data analytics if it is needed.

Step 18 The NWDAF 13 notifies the MDAF 18 or any other relevant entity or service consumer/producer in the OAM 17 the QoE analytics results. The QoE analytics results are based on data analytics on QoE measurements and related network data/management data.

Step 19: The MDAF 18 or any other relevant entity or service consumer/producer in the OAM 17 performs data analytics on QoE analytics results and other related network and management data and notifies the Management Function or any other relevant entity or service consumer/producer its analytics results.

Step 20: The Management Function or any other relevant entity or service consumer/producer in the OAM 17 makes its decision and applies the new configurations to the network and to the RAN 5 if it is necessary.

Repeat Step 12 to 20 until UE's QoE is satisfied (i.e. SLS is guaranteed).

In this solution, the SLS assurance procedure has been automated. As its result, it allows the network to react quickly and efficiently to QoE degradation and therefore enhance user's experience efficiently and in a timely manner.

Beneficially, the above described embodiments may include, although they are not limited to, one or more of the following functionalities:

1) A closed-loop SLS assurance mechanism, which involves the UE 3, the RAN 5, the core network 7, and the OAM 17. This mechanism has a new trigger to automatically report the QoE degradation on a certain service type, using data analytics on the collected QoE measurement, and adjusting the network configuration based on UE's QoE measurement and analytics result in an end-to-end close-loop design 2) QoE measurements are sent to the NWDAF 13/MDAF 18 for data analytics. OAM's decision based on the analytics results is more reliable than that of based purely on QoE measurement directly collected from the UE 3. The analytics results are based on QoE measurement, other network data and management data.

Exemplary methods of the present disclosure having the above-described functionalities are provided comprising (at least some of) the following steps:

1) A closed-loop QoE-based data analytics mechanism:
   The network configures the UE 3 with the policies with the QoE related reporting criteria to automatically report.
   The UE 3 reports its QoE measurement to the network (e.g. NWDAF/MDAF) when reporting criteria is met. The NWDAF 13/MDAF 18 reports analytics results to the Management Function. The analytics results are based on data analytics on QoE measurements and related network data/management data.
   The Management Function make its decision and applies the new configuration to the network.
   The UE 3 reports QoE measurement based on the network's request or defined policies
   The OAM 17 adjusts its network configuration based on QoE analytics result with other network data until the UE's SLS can be guaranteed.

2) The QoE measurement configuration criterion and reporting format include parameters, at least one of the type of reporting, the service type, the event that triggers the QoE measurement reporting, and thresholds that triggers the QoE measurement reporting.
   The types of reporting can be either scheduled or event-based reporting.
   The service type includes the type of service for QoE measurement reporting, at least one of streaming services, MTSI services, Network Controlled Interactive Service, VR Based Interactive Service, Cloud Rendering for Games, and IoE based social networking services.
   The event that triggers the QoE measurement reporting includes the event(s), at least one of QoE metrics of a certain service type is below a threshold. Thresholds that trigger the QoE measurement reporting include the threshold(s) of QoE metrics of a certain service type, at least one of Representation Switch Events, Average Throughput, Initial Playout Delay, Buffer Level, Play List, MPD Information, Playout Delay for Media Start-up and Device information.

Embodiments of the present disclosure provide an new close-loop SLS assurance mechanism, which is among UE, RAN, the core network and OAM. It allows automatic QoE measurement collection, and therefore avoids the current inefficient and lengthy procedure to deal with UE's QoE degradation.

Detailed embodiments have been described above. As those skilled in the art will appreciate, a number of modifications and alternatives can be made to the above embodiments while still benefiting from the inventions embodied therein. By way of illustration only a number of these alternatives and modifications will now be described.

In the above description, the UE, the (R)AN node, and the core network/OAM node are described for ease of understanding as having a number of discrete modules (such as the communication control modules). While these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the core network/OAM node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network/OAM node in order to update their functionalities.

The above embodiments are also applicable to 'non-mobile' or generally stationary user equipment.

The method performed by the OAM function may further comprise obtaining QoE analytics results from a data analytics function and adjusting a network configuration based on said results in order to meet the SLS.

The method performed by the OAM function may further comprise determining at least one new or updated policy for SLS assurance for said UE, obtaining QoE analytics results from a data analytics function and adjusting a network configuration determining, based on said results, until said SLS is met at least one new or updated policy for SLS assurance for said UE.

The method performed by the UE may further comprise reporting, to a data collection centre, a result of a QoE measurement when the UE determines at least one of the following: a QoE degradation associated with a service type based on an associated criterion; and at least one QoE metric of a service type being below an associated threshold based on an associated criterion.

The method performed by the UE may comprise receiving said at least one policy from the OAM function via a policy control function (PCF) and a radio access network (RAN).

The method performed by the UE may comprise receiving said at least one policy via a QoE measurement configuration procedure (e.g. using at least one radio resource control (RRC) connection reconfiguration message).

The at least one policy may be based on an SLS and at least one operator policy applicable to the UE.

The QoE measurement reporting criteria may comprise a criterion for automatic QoE measurement reporting by the UE to a data collection centre of the OAM.

The QoE measurement reporting criteria may comprise at least one of: a criterion for QoE measurement reporting when the UE determines a QoE degradation associated with a service type; and a criterion for QoE measurement reporting when the UE determines that at least one QoE metric of a service type is below an associated threshold.

The OAM function may comprise a management data analytics function (MDAF).

Various other modifications will be apparent to those skilled in the art and will not be described in further detail here.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Abbreviations and Terminology

3 GPP 3rd Generation Partnership Project
5G Core Network
5G System
5G Access Network
AF Application Function
AI Artificial Intelligence
AMF Access and Mobility Management Function
AN Access Network
CM-CONNECTED Connection Management—CONNECTED State
CM-IDLE Connection Management—IDLE State
D2D Device to device
DNN Data Network Name
GFBR Guaranteed Flow Bit Rate
IoE Internet of Everything
MDAF Management Data Analytics Function
MDAS Management Data Analytics Service
MF Management Function
MnS Management Service
ML Machine Learning
MM Mobility Management
MTSI Multimedia Telephony Service for IMS
N1 Reference point between the UE and the Access and Mobility
Management Function
 N2 Reference point between the (R)AN and the Access and Mobility Management Function
 NAS Non-Access-Stratum
 NF Network Function
 NG Next Generation
 NG-RAN Next Generation-Radio Access Network
 NWDAF Network Data Analytics Function
 OAM Operations, Administration and Maintenance
 OTT Over the Top PCC Policy and Charging Control
PCF Policy Control Function
PDB Packet Delay Budget
PDU Protocol Data Unit
PER Packet Error Rate
ProSe Proximity-based Service
QFI QoS Flow Identifier
QoE Quality of Experience
RAN Radio Access Network
RRC Radio Resource Control
SBA Service-based Architecture
SLA Service-level Agreement
SLS Service Level Specification
SM Session Management
SMF Session Management Function
TCE Trace Collection Entity
UE User Equipment
UPF User Plane Function
Uu The reference point between the UE and the radio access network
V2X Vehicle-to-everything
VR Virtual Reality

LIST OF REFERENCES

[1] 3GPP TS 23.501 V16.2.0
[2] 3GPP TS 23.502 V16.2.0
[3] 3GPP TS 23.503 V16.2.0
[4] 3GPP TS 28.404 V16.0.0
[5] 3GPP TS 28.405 V1.0.0
[6] 3GPP TS 36.331 V15.6.0
[7] 3GPP TS 23.288 V16.1.0
[8] 3GPP TS32.422 V15.2.0

The invention claimed is:

1. A method performed by an operations, administration and maintenance (OAM) function node for closed loop service level specification (SLS) assurance, the method comprising:
transmitting, to a user equipment (UE) via a radio access network (RAN) node, quality of experience (QoE) measurement configuration for the SLS assurance for the UE including a reporting criterion, a reporting format, service type, and information indicating whether the UE should report;
obtaining, from a data analytics function entity including a management data analytics function (MDAF) node and a network data analytics function (NWDAF) node, a quality of experience (QoE) analytic result based on a quality of experience (QoE) measurement reporting which is performed by the UE based on the reporting criterion, the reporting format, the service type, and the information indicating whether the UE should report;
adjusting a network configuration based on the QoE analytic result; and
autonomously repeating the obtaining and adjusting in a closed loop in the OAM function node until the SLS is assured,
wherein the service type is defined to include a value "Virtual Reality (VR) services".

2. A method performed by a user equipment (UE) for closed loop service level specification (SLS) assurance, the method comprising:
receiving, from an operations, administration and maintenance (OAM) function node via a radio access network (RAN) node, a quality of experience (QoE) measurement configuration for the SLS assurance including a reporting criterion, a reporting format, a service type, and information indicating whether the UE should report;
performing a quality of experience (QoE) measurement reporting based on the reporting criterion, the reporting format, the service type, and the information indicating whether the UE should report; and
receiving an adjusted network configuration based on a quality of experience (QoE) analytic result based on the QoE measurement reporting, wherein:
the QoE analytic result is received from a data analytics function entity including a management data analytics function (MDAF) node and a network data analytics function (NWDAF) node,
the performing and the receiving is autonomously repeated by a closed loop in the OAM function node until the SLS is assured, and
the service type is defined to include a value "Virtual Reality (VR) services".

3. The method according to claim 2, wherein the QoE measurement configuration includes further information indicating whether the UE should report time related information.

4. An operations, administration and maintenance (OAM) function node for closed loop service level specification (SLS) assurance, the OAM function node comprising:
at least one memory storing instructions; and
at least one processor configured to process the instructions to:
transmit, to a user equipment (UE) via a radio access network (RAN) node, a quality of experience (QoE) measurement configuration for the SLS assurance for the UE including a reporting criterion, a reporting format, service type, and information indicating whether the UE should report;
obtain, from a data analytics function entity including a management data analytics function (MDAF) node and a network data analytics function (NWDAF) node, a quality of experience (QoE) analytics result based on a quality of experience (QoE) measurement reporting which is performed by the UE based on the reporting criterion, the reporting format, the service type, and the information indicating whether the UE should report;
adjust a network configuration based on the QoE analytics result; and
autonomously repeat the obtaining and adjusting in a closed loop in the OAM function node until the SLS is assured,
wherein the service type is defined to include a value "Virtual Reality (VR) services".

5. A user equipment (UE) for closed loop service level specification (SLS) assurance, the UE comprising:
at least one memory storing instructions; and
at least one processor configured to process the instructions to:
receive, from an operations, administration and maintenance (OAM) function node via a radio access network (RAN) node, a quality of experience (QoE) measurement configuration for the SLS assurance including a reporting criterion, a reporting format, service type, and information indicating whether the UE should report;
perform a quality of experience (QoE) measurement reporting based on the reporting criterion, the reporting format, the service type, and the information indicating whether the UE should report; and receive an adjusted network configuration based on a quality of experience (QoE) analytic result based on the QoE measurement reporting, wherein the QoE analytic result is received from a data analytics function entity including a management data analytics function (MDAF) node and a network data analytics function (NWDAF) node, wherein the performing and the receiving is autonomously repeated by a closed loop in the OAM function node until the SLS is assured, and wherein the service type is defined to include a value "Virtual Reality (VR) services".

\* \* \* \* \*